United States Patent [19]

Sims

[11] 4,302,044
[45] Nov. 24, 1981

[54] TRANSPORT TRUCK WITH MULTIPLE ACCESS CARGO CARRYING BODY

[76] Inventor: Elmer W. Sims, 15611 Narcissus La., Orland Park, Ill. 60462

[21] Appl. No.: 46,252

[22] Filed: Jun. 7, 1979

[51] Int. Cl.³ ................................................ B60P 9/00
[52] U.S. Cl. ................................. 296/183; 296/100; 105/378
[58] Field of Search ................... 296/183, 100, 137 B, 296/98; 105/377, 378, 379; 49/333–335, 388, 371

[56] References Cited

U.S. PATENT DOCUMENTS

| | | | |
|---|---|---|---|
| 439,912 | 11/1890 | Ward | 49/371 |
| 1,035,719 | 8/1912 | McCarty | 49/333 |
| 2,866,663 | 12/1958 | Ashford | 49/125 |
| 2,955,874 | 10/1960 | Brindley | 105/377 |
| 3,069,199 | 12/1962 | Reardon | 296/100 |
| 3,472,548 | 10/1969 | Comisac | 296/98 |
| 3,558,184 | 1/1971 | Plegat | 296/146 |
| 3,815,518 | 6/1974 | Schneider | 105/378 |

*Primary Examiner*—Robert R. Song

[57] ABSTRACT

An over the road truck having a hard top truck body which permits full length opening of the top for loading and unloading of cargo by overhead cranes, as well as substantially unobstructed access from the rear and either side thereof for loading by lift truck or manual means. To permit top access, the truck body has roof doors pivotably mounted on opposite sides of the body which are easily operable from an end of the body. The body further includes sliding side doors that permit access along the entire length of either side of the body, as well as end doors for rear loading. To permit maximum unobstructed access to the interior of the body while maintaining sufficient rigidity for extended over the road use, removable side and roof supports are provided.

15 Claims, 16 Drawing Figures

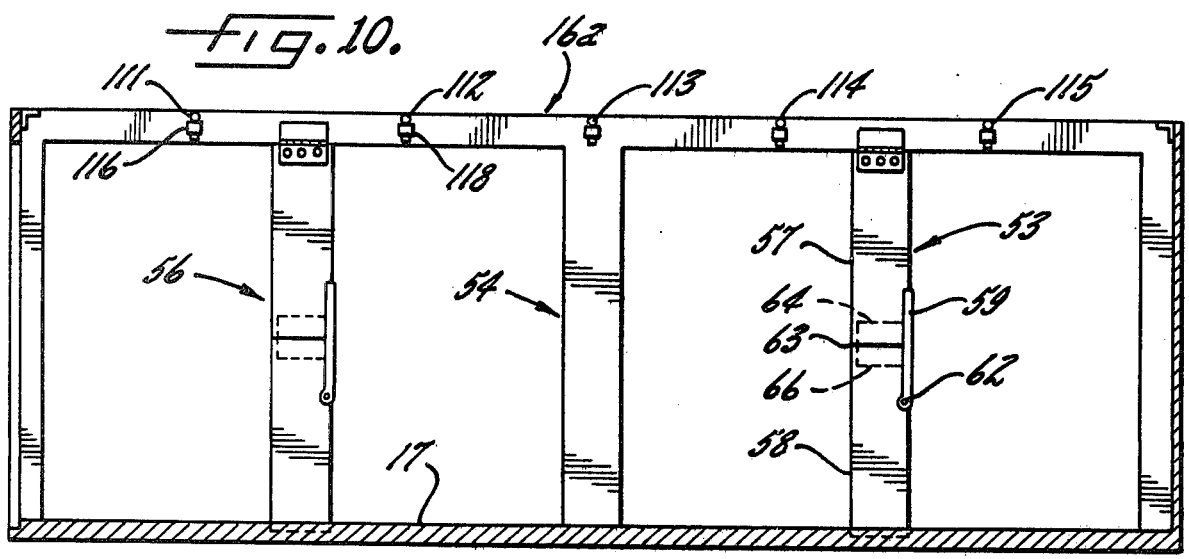
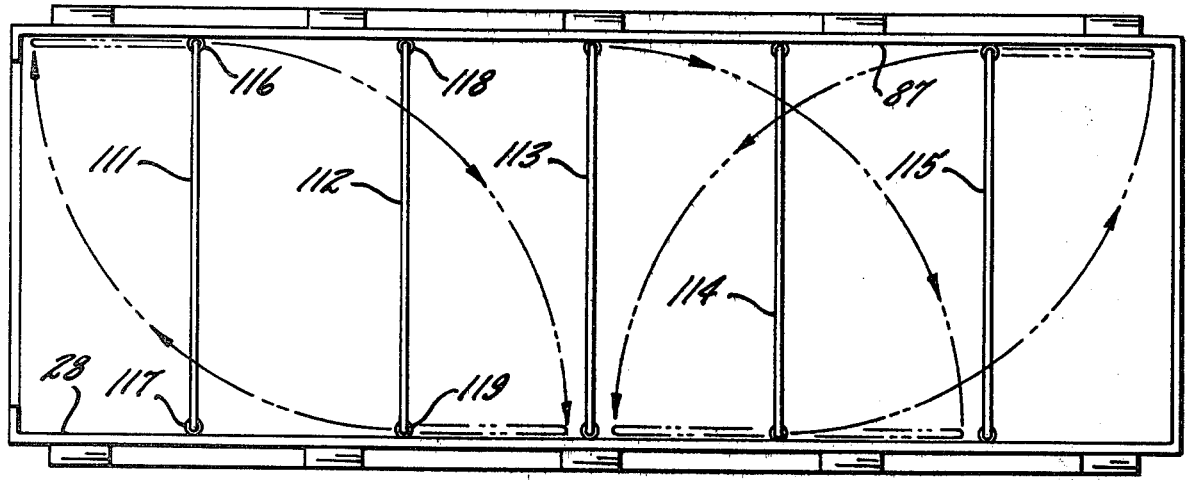
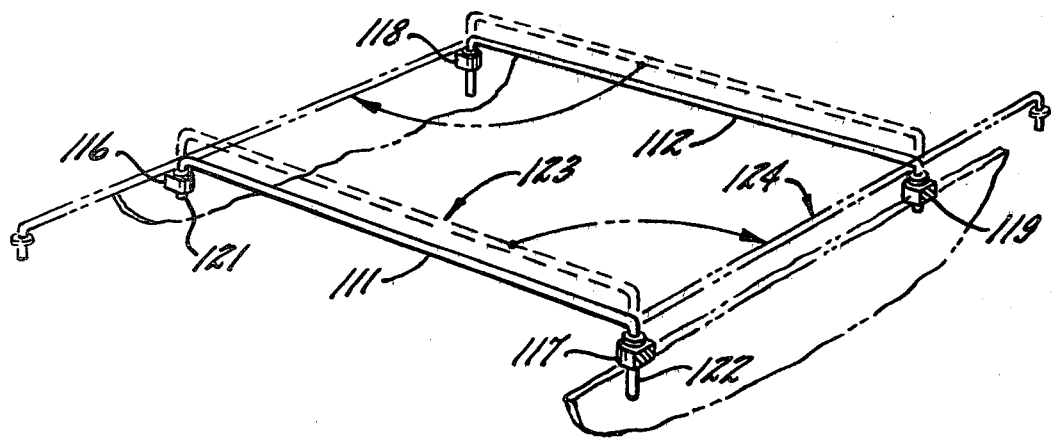

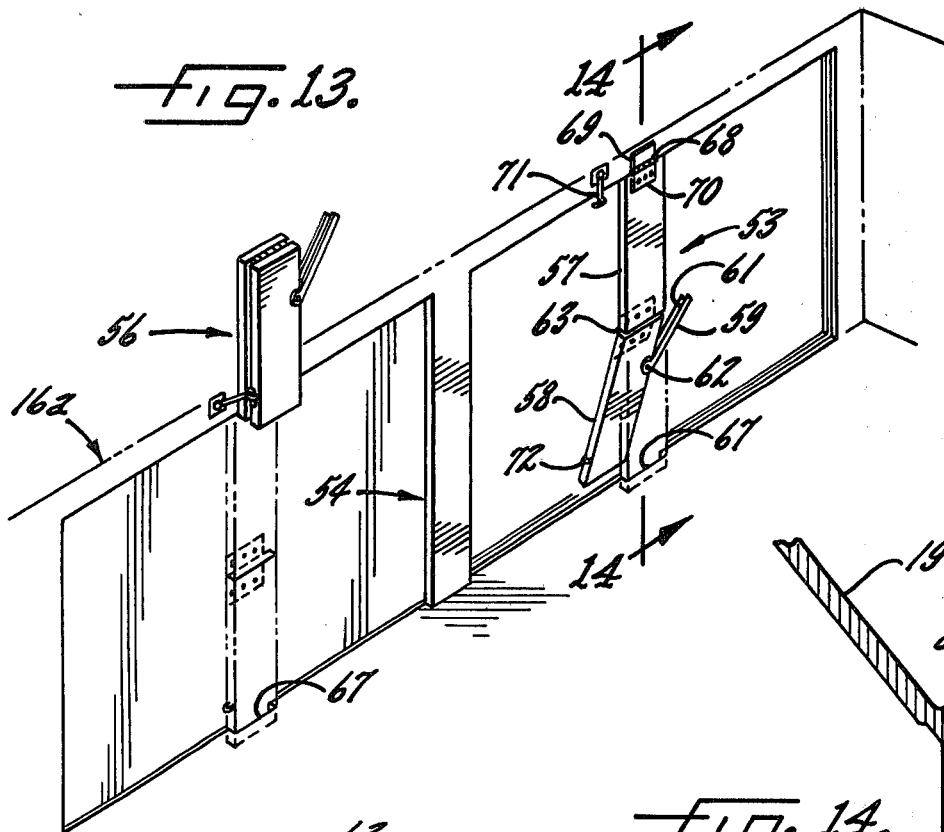
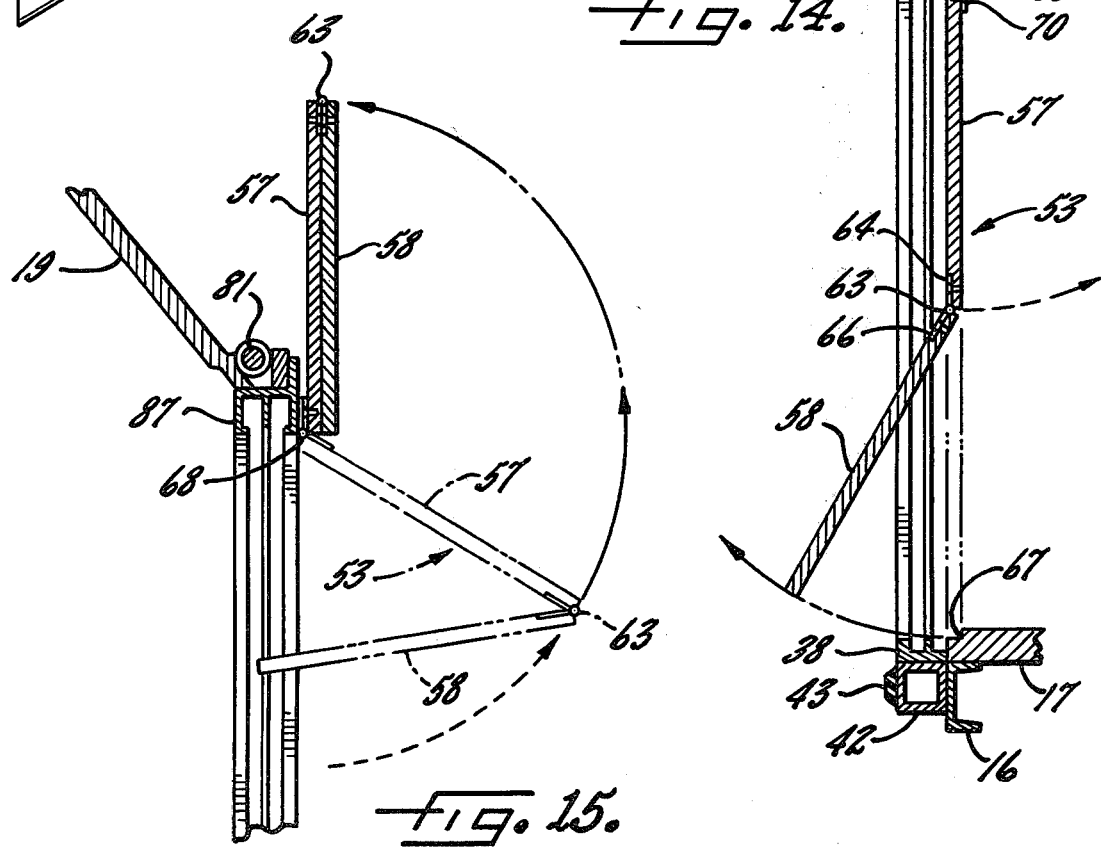

TRANSPORT TRUCK WITH MULTIPLE ACCESS CARGO CARRYING BODY

DESCRIPTION OF THE INVENTION

The present invention relates generally to trucks, and more particularly to an improved truck body which is adapted to haul various types and sizes of commodities.

Large cargo materials such as steel, lumber and machinery typically are hauled by open top trucks which permit the cargos to be loaded and unloaded by overhead cranes. Since the cargos of such open top trucks usually are covered only by canvas or the like, such trucks have been unsuitable for hauling many other products, such as farm commodities which must be enclosed during transit, or many palletized loads that are more suitably loaded into the side or rear of the truck by forklift or manual means. Heretofore, it has not been practical to utilize removable hardtops for such large cargo trucks and proposals that have been made generally are complex and cumbersome to operate and usually require power means, such as overhead hoists to effect the removal. A further practical problem in the design of such large hardtop truck bodies, which commonly are 40 ft. in length and designed for heavy cargos, has been to provide maximum access to the interior of the truck body while maintaining sufficient rigidity and stability of construction to withstand the forces such truck bodies incur in day-in and day-out over the road use.

It is an object of the present invention to provide an improved hard top truck body that is adapted to readily accommodate long cargos, which typically are loaded and unloaded from the top of the truck, as well as commodities which must be protectively contained during transport and cargos that commonly are loaded from the sides or rear of the truck by lift-truck or manual means.

Another object is to provide a hard top truck body as characterized above that permits full-length opening of the top, as well as substantially unobstructed access from the rear and either side thereof.

A further object is to provide a truck body of the above kind which permits easy partial or complete opening of the top of the truck body without auxiliary power means.

Still another object is to provide a truck body of the foregoing type which permits essentially complete top, side and rear opening for loading and unloading purposes, but which has sufficient strength and stability for carrying maximum loads over the road.

Other objects and advantages of the invention will become apparent as the following description proceeds taken in conjunction with the accompanying drawings, in which:

FIG. 10 is a vertical section illustrating the construction of one of the sides of the truck body;

FIG. 11 is a top plan view illustrating the construction and use of the roof support of the illustrated truck body;

FIG. 12 is a perspective further illustrating the use of the roof support of the illustrated truck body;

FIG. 13 is a perspective illustrating the operation of the removable side supports of the illustrated truck body; and FIGS. 14 and 15 are vertical sections further illustrating the operation of the collapsible side supports of the illustrated truck body.

Figure 1:
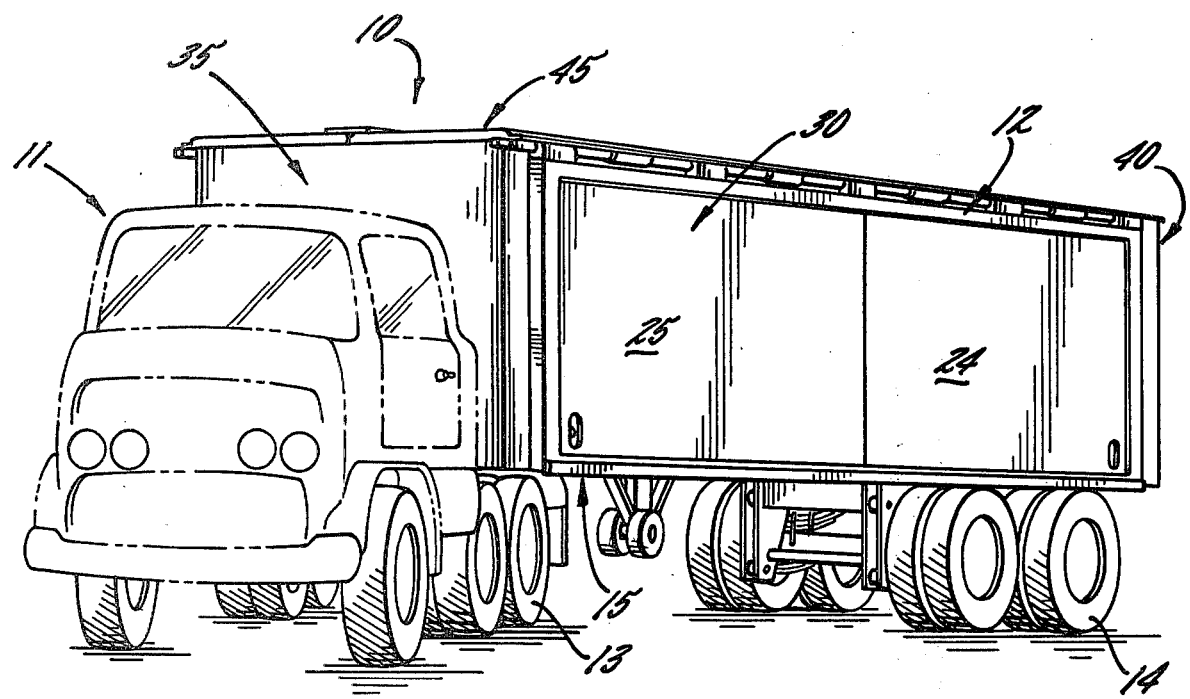
FIG. 1 is a perspective of a truck having a body embodying the present invention.

While the invention is susceptible of various modifications and alternate constructions, a certain illustrative embodiment thereof has been shown in the drawings and will be described below in more detail. It should be understood, however, that there is no intention to limit the invention to the specific form disclosed, but, on the contrary, the intention is to cover all modifications, alternative constructions, and equivalents falling within the spirit and scope of the invention.

Figure 2:
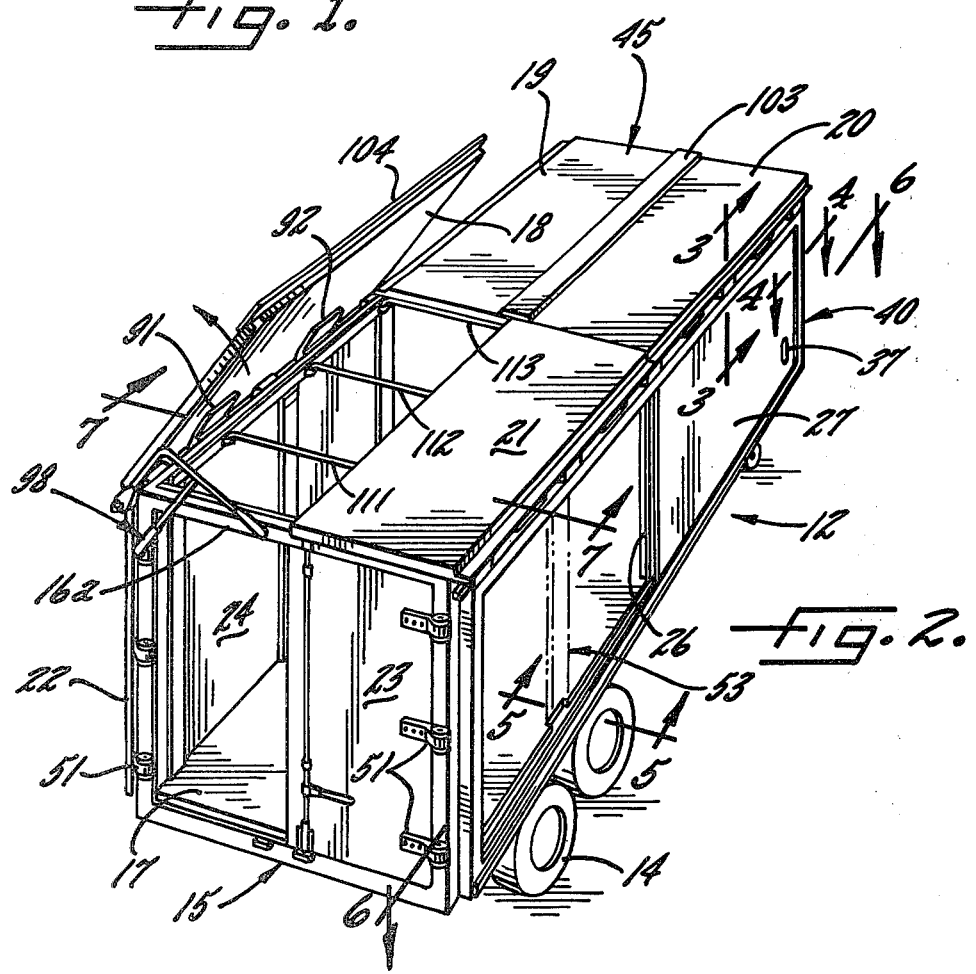
FIG. 2 is a perspective of the truck body shown in FIG. 1 with certain of the access doors open or partly open.

Turning first to FIGS. 1 and 2, there is shown a truck 10 having a cab 11 and a cargo-carrying truck body 12 embodying the present invention. In the present instance a tractor trailer combination is illustrated, but it is contemplated that the invention may be practiced in conjunction with truck bodies of related types. The truck body 12 in this case is supported by a forward set of wheels 13 associated with the tractor cab and a set of wheels 14 located at the rear of the truck body.

The truck body 12 is of the hard top type comprising a base 15 which supports lateral sides 30 and front and rear ends 35, 40 to define a box shaped cargo carrying area. A hard top 45 is provided for protectively enclosing cargo during transit. The base 15 is made of a steel angle iron frame 16 that supports transversely disposed wooden planks to form the interior floor of the body. The sides 30, ends 35, 40 and top 45 preferably have an exterior formed of a plywood base construction, such as fiberglass impregnated plywood designated Cladd Tuff, a trademark of Cor Tec of Cincinnati, Ohio. Such construction, and particularly the load bearing portions thereof, preferably is steel reinforced with additional framing 16a such as by structural angle irons and the like, as will become apparent from the following description.

In accordance with the present invention, means are provided for permitting full length opening of the top of the truck body for loading and unloading purposes, as well as substantially unobstructed access to the interior of the body from the rear and either side thereof. To this end, the sides of the body each include sliding doors 24, 25 and 26, 27 which are slidable to overlapping positions to make available for loading approximately half of either or both sides of the truck body 12. Since the sliding door panels 26, 27 on the right side of the body are essentially the same in construction and mounting as the door panels 24, 25 on the other side, only the right side doors shall be described in detail.

To support the sliding door panels 26 and 27 an extruded upper track member 28 is welded or riveted along the entire truck body frame 16a and defines two parallel channels 29 and 31 which receive the door panels 26 and 27, respectively. The channels 29, 31 are spaced slightly, with the illustrated channel 31 being on the outside, such that the doors 26, 27 are positionable into close adjacent relationship. While the track member 28 is shown as a single extruded piece, it will be understood that it could be formed of welded angle irons and channels, and thereby, further enhance the structural rigidity of the body.

Rotatably mounted to the upper portion of the door panel 26 are a series of rollers 32 which roll upon an inwardly extending flange 33 at the bottom of the channel 29. Similarly, a series of rollers 34 are rotatably mounted to the upper portion of the door panel 27 and are supported upon an inwardly extending flange 36 at the bottom of the channel 31. Thus, since the dual track extrusion 28 extends the length of the truck body 12 and since the door panels 26 and 27 are in inner and outer tracks, respectively, they are each slidable separately or together from one end of the trailer body to the other to selectively provide access to the interior of either half of the body. To slide the doors such as 27, hand grips such as 37 are provided and may include locking means for locking the doors in a closed position.

In order to guide the bottom portions of the door panels 26 and 27 a lower track extrusion 38 is provided having channels 39 and 41 for receiving the bottom portions of the door panels 26 and 27, respectively. The channels 39 and 41 are positioned beneath and in alignment with the channels 29 and 31 in the upper track extrusion 28 to provide aligned and free movement of the door panels from end to end of the trailer body 12. Preferably, the track 38 is disposed slightly below the level of the floor 17 of the body so as to minimize damage during loading or unloading. The lower track extrusion 38 is rigidly mounted on a door support beam 42 which is in turn welded or riveted to the frame 16. A resilient bumper or rub rail 43 also is affixed to the outer surface of the support beam 42 to protect the door panels and the lower track extrusion 38 from minor collision damage.

Figure 4:
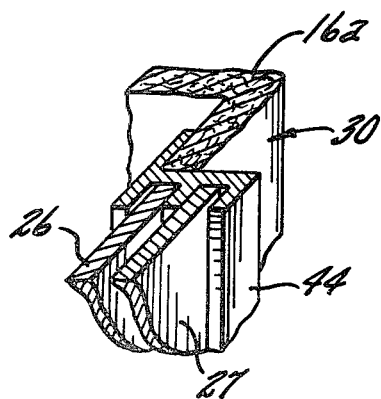
FIG. 4 is an enlarged fragmentary section taken in the plane of line 4—4 of FIG. 2.
Figure 6:
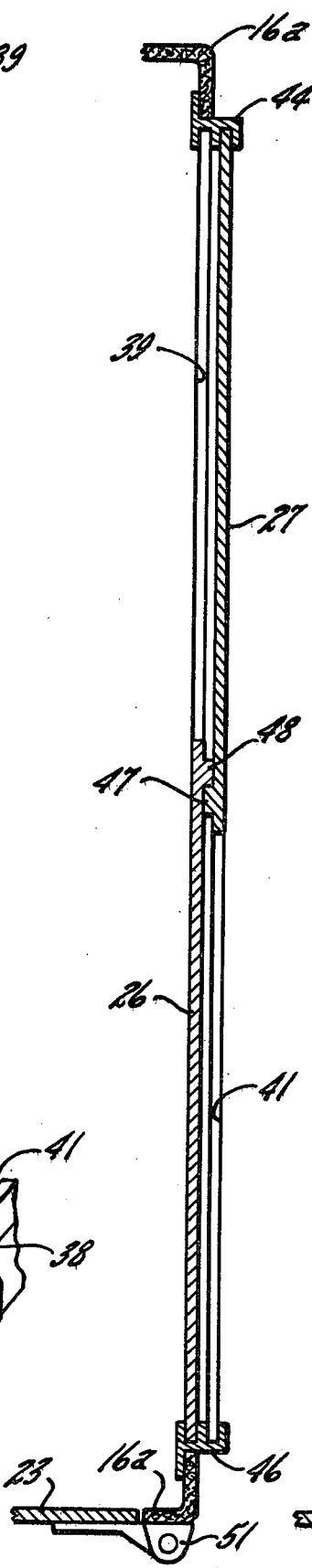
FIG. 6 is an enlarged fragmentary section taken in the plane of line 6—6 of FIG. 2, showing the side doors of the truck body in a closed position.
Figure 6A:
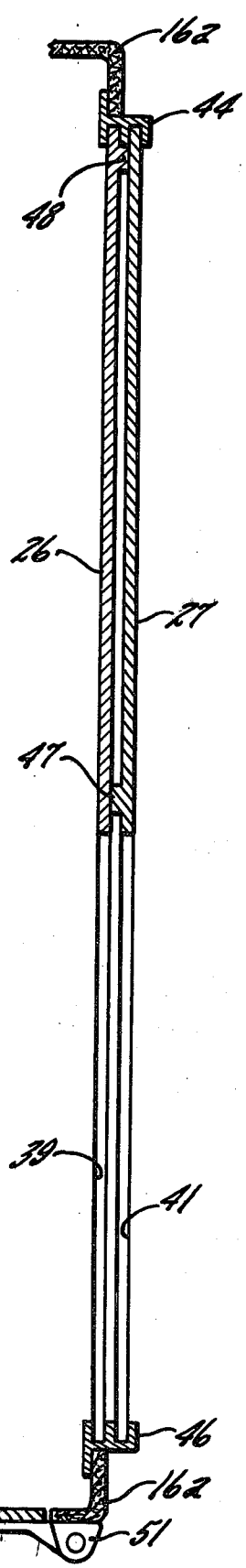
FIG. 6a is an enlarged fragmentary section taken in the plane of line 6—6 in FIG. 2, showing one of the side doors of the truck in an open position.
Figure 7:
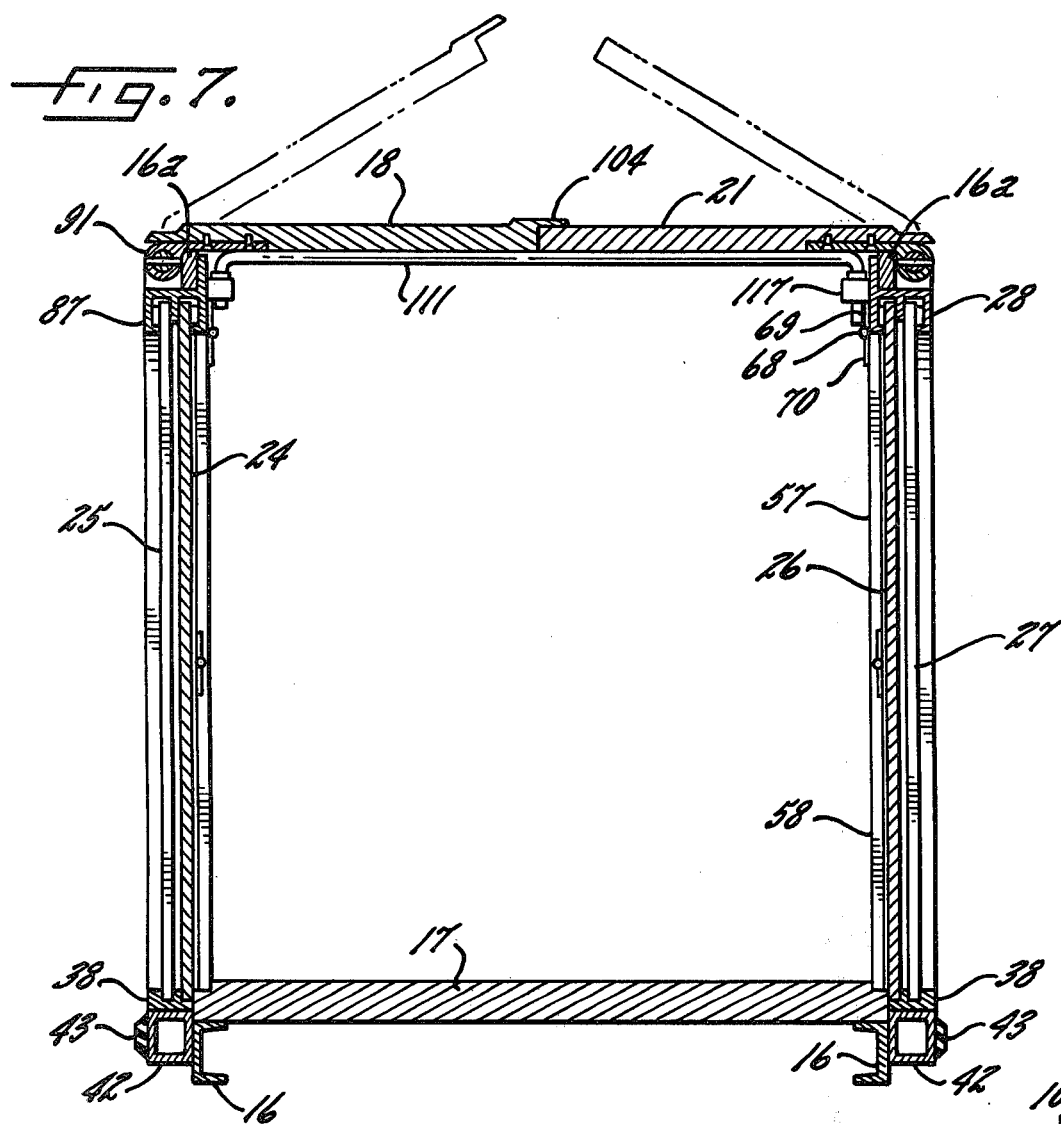
FIG. 7 is an enlarged vertical section taken in the plane of line 7—7 in FIG. 2, showing the top access doors in a partially open condition.

A front, channeled, door-receiving track extrusion 44 and a similar rear track extrusion 46 are rigidly attached to the truck body frame 16a at the front and rear of the truck body 12, respectively. The track extrusions 44 and 46 each have an outer channel receiving the door panel 27 when it is in either of its extreme forward or rearward positions, and also an inner channel receiving the door panel 26 when it is either fully forward or fully rearward. In FIGS. 2, 4 and 6a, the doors 26 and 27 are both in their fully forward positions and are received in the channels of the front extrusion 44. As shown best in FIG. 6a and FIG. 2, when the door panels 26 and 27 are both in their fully forward positions, approximately the rear half of the right side of the truck body 12 is open for loading or unloading cargo. As shown in FIG. 6, the inner door 26 may be slid fully rearwardly to be received in the inner channel of the rear track extrusion 46 to fully enclose the right side of the truck body 12.

Near the rearward end of the outer door panel 27 as shown in FIGS. 6 and 6a, there is an inwardly extending portion 47 of the door panel which extends vertically from just beneath the upper track extrusion 28 to just above the lower track extrusion 38. There is a similar outwardly extending portion 48 of the inner door panel 26 located near the forward end of the door panel. As best seen in FIG. 6, these two portions 47 and 48 combine to provide a seal for the interior of the truck body 12. These mutually engaging portions 47 and 48 of the door panels 26 and 27 may be lined with an appropriate sealing strip or gasket material for additional sealing. While the doors 26 and 27 have been shown as suspended from upper rollers 32 and 34 riding in the channels 29 and 31, other sliding door panel mounting arrangements are possible. For example, an upper track extrusion might be provided similar in appearance to the lower track extrusion 38 with the additional provision in the channels of spring biased strips bearing against the tops and bottoms of the door panels.

In order to provide loading and unloading access to the rear of the truck body 12, conventional hinged doors 22 and 23 are provided. The rear door 22 is shown in its opened position, and the other rear door 23 may be opened by swinging the door 23 upon hinges such as 51 to its opened position, thereby leaving the rear of the truck body 12 entirely open. A conventional latching and locking rod mechanism 52 is provided for each rear door.

In keeping with the invention, a plurality of collapsible roof and side support means are provided which enhance stability of the truck body during transit, but are selectively positionable such as to permit unobstructable side access to the body interior during loading and unloading. With particular reference to FIGS. 7, 10, and 13-15, the illustrated truck body has two collapsible or removable roof supports 53 for the right side of the truck body, as well as a permanent center roof support 54. The supports 53, 54 all are disposed inwardly of the sliding side doors to prevent interference therewith, and are in addition to the support of the frame 16a at the rear and front ends of the truck body sides. Since the left side roof supports are essentially the same as those for the right side of the truck body 12, only the right side supports need be described in detail.

It will be seen that the central roof support 54 of the frame 16a does not significantly interfere with side loading and unloading of the truck body 12 from the right side since at least approximately one-half of the side is covered by the doors 26 and 27 at any one time. Therefore, at least most of the support 54 is obscured by the doors 26 and 27 even when they are in their full forward or full rearward positions.

To permit access to a full half of the body 12 when the side doors are open, the respective removable roof support, such as the support 53 in FIG. 2, may be conveniently folded and raised out of the way of the cargo and maintained in this raised position during the loading or unloading operation. In its initial supporting position, the support 53 is fixed in an essentially vertical configuration. The support 53 is made up of an upper support panel 57 and a lower support panel 58, conveniently constructed of the Clad Tuff material described earlier. In the normal vertical orientation of the roof support 53, the two support panels 57 and 58 are clamped into an aligned vertical position by a clamping member 59 which fits over an edge of the two panels and defines a channel 61 in which the two panel edges are maintained.

In order to move the support 53 upwardly and out of the way of cargo to be loaded or unloaded, the clamping member 59 is rotated away from the panels 57 and 58, releasing the panels, and the panels are then folded together with their outer faces meeting and the pair of folded panels swung upwardly to a raised position and secured.

To release the panels 57 and 58, the clamping member 59 is rotated about a point of pivotal attachment to the lower support panel 58. The clamping member may be conveniently riveted or otherwise pivotally attached to the lower panel 58 by a fastener 62. The upper support panel 57 is hingedly attached to the lower support panel 58 by a hinge 63 having an upper hinge plate 64 and a lower hinge plate 66 which are fastened to the panels 57 and 58, respectively.

Figure 5:
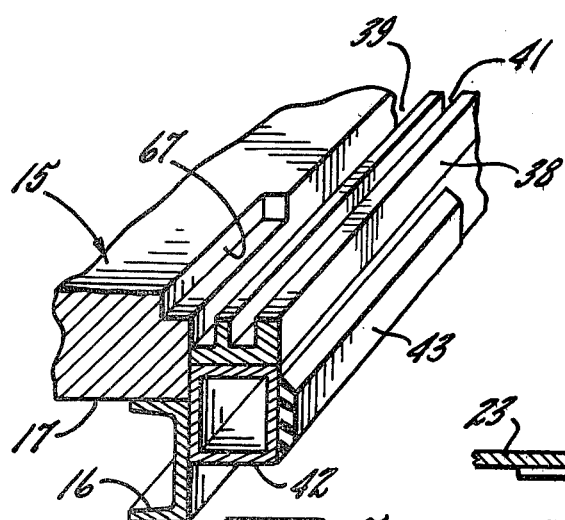
FIG. 5 is an enlarged fragmentary section taken in the plane of line 5—5 of FIG. 2.

As best shown in FIGS. 5, 10 and 13, the lower end portion of the support panel 58 is received in a depression 67 in the floor 17 of the truck body 12. In order to begin the folding operation for the support panels, an inward force is applied at the hinge 63, bowing the connecting point of the panels 57 and 58 inwardly, freeing the bottom end of the lower panel 58 from the depression 67.

So that complete folding of the support 53 may be effected, the upper support panel 57 is hingedly attached to the upper track extrusion 28, which is attached to the frame 16a. For this purpose a hinge 68 has an upper hinge plate 69 rigidly attached to the track extrusion 28 such as by welding and a lower hinge plate 70 attached to the upper support panel by screws. To lift the removable support 53 to its raised position, after the lower end portion of the lower support panel 58 has been freed from the depression 67, the lower panel 58 is swung upwardly toward the upper panel 57 as shown in FIG. 14; then as the lower panel 58 is raised further toward the upper panel 57, rotating about the hinge 63, the upper panel 57 is rotated inwardly about the hinge 68, as shown in dashed lines in FIG. 15. The raised, cargo-clearing, position for the panels 57 and 58 is shown in solid lines in FIG. 15.

In order to maintain the panels in their raised position for cargo loading and unloading, a hook and eye arrangement is provided. A hook 71 is rotatably attached to the upper track extrusion 28, and the hook is engaged in an eye attached to the lower side portion of the lower panel 58 when the panels are in their raised position. This locking arrangement is illustrated for the raised support assembly 56 in FIG. 13 with a hook 73 engaged in an eye 74. The removable support 56 operates in the same fashion as support 53, and therefore shall not be described in detail. In order to load or unload cargo through the front half of the right side of the truck body 12, the removable support 56 would be moved to its raised position, as shown in FIG. 13.

While securing the collapsible support 56 in the raised position in the manner shown, would necessitate first opening the roof panel directly above it, as will become apparent below, it will be understood that an appropriate hook may be provided on the underside of each roof panel for securing the support 56 in a horizontal retracted position with the roof panel remaining closed.

According to a further aspect of the invention, the top of the truck body comprises doors that are pivotably mounted upon opposite sides of the body for providing complete access to the top of the body along the entire length thereof. In this instance, a pair of doors are provided along each side of the body, each extending one half the length of the body, and means are provided for opening and closing the doors from a respective end of the truck body. The illustrated truck body includes a pair of top opening door panels 18, 19 and 20, 21 on each side of roof, and means are provided for selectively opening all or any one of the doors for overhead loading.

Figure 8:
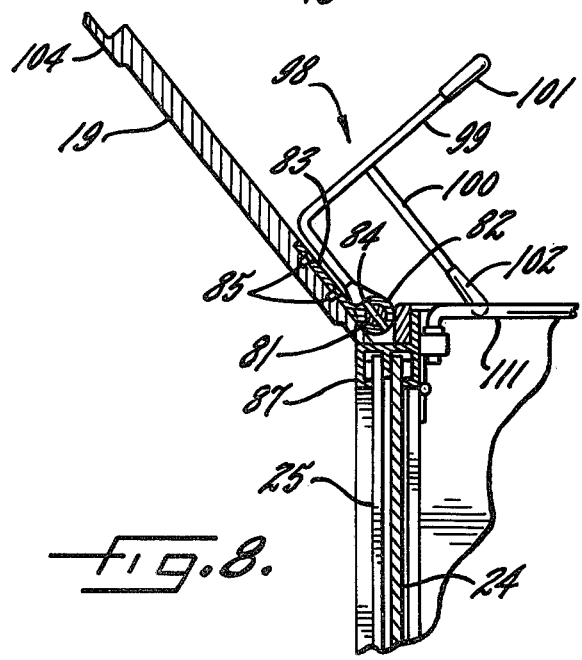
FIG. 8 is an enlarged section showing the mechanism for opening one of the top doors.
Figure 9:
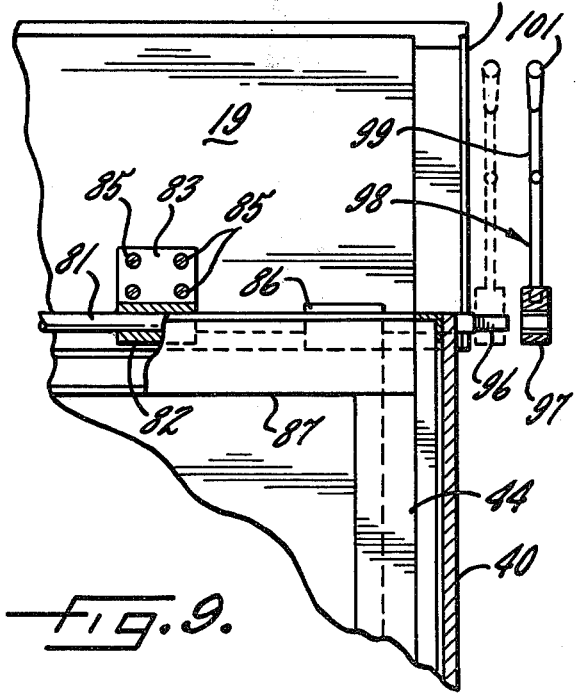
FIG. 9 is a plan view of the top door shown in FIG. 8 with the opening ratchet shown in solid lines in a removed position and in phantom in a mounted operating position.

To facilitate pivotal mounting and opening of the roof doors, a rotatable control bar 81 is rigidly attached to a respective roof panel, such as the panel 19 shown in detail in FIGS. 8 and 9, so that rotation of the bar in one direction opens the roof panel and rotation of the bar in the other direction closes the roof panel. The control bar 81 is received within a collar assembly 82 which includes a collar plate 83 fastened to the roof panel 19, which is preferably of the above-mentioned Clad Tuff material, by screws 85 or other fastening means. A pin 84 is anchored through the collar 82 and bar 81 to rigidly attach the control bar 81 to the collar. The control bar 81 is rotatably received in several sleeves 86 mounted on the upper sliding door track extrusion 87, corresponding to the track extrusion 28 on the right side of the truck body 12.

Figure 3:
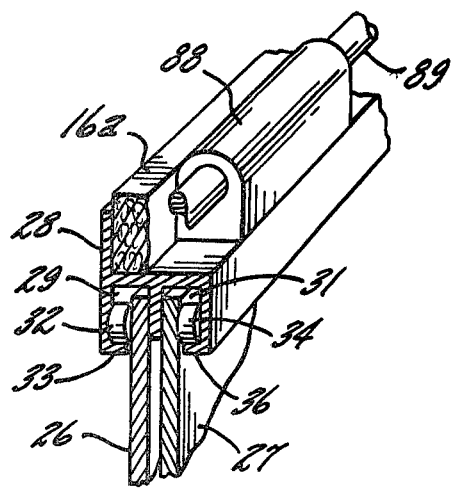
FIG. 3 is an enlarged fragmentary section taken in the plane of line 3—3 in FIG. 2.

As is best shown in FIG. 3, a sleeve 88 mounted on the right side track extrusion 28 rotatably receives a control bar 89 associated with the roof panel. Referring momentarily to FIG. 2, the full length of a partially raised roof panel is shown, illustrating the collar elements 91 and 82 and sleeves 93–95 for the roof panel 18. Each roof panel 18–21 in the present instance, has associated therewith two collar elements, such as 91 and 92, and two sleeve members, such as 93 and 94, for panel 18, and has its associated control bar partially received in a central sleeve element such as 95.

The panel 19 may be moved from its closed position as shown in FIG. 2 to a fully opened position as shown in FIG. 8 by rotating the control rod 81 in a counterclockwise direction as viewed in FIG. 8. To rotate the control rod 81, the end of the rod extending forwardly of the front of the truck body 12 is keyed at 96 to receive the head 97 of a correspondingly apertured tool 98 having a pair of handles 99 and 100 disposed at a 90° to one another. By gripping the handles at their ends at hand grips 101 and 102, sufficient torque may be applied to manually rotate the control bar 81 to raise the roof panel 19 and rotate it to its opened position of FIG. 8. The tool 98, when not in use, may be stored in the truck 10 so that only the keyed end 96 of the control rod 81 is exposed. Alternatively, the end 96 of the rod 81 could be keyed for engagement with a powered ratchet device or similar mechanism.

The control rod associated with each of the four roof panels 18–21 extends either forwardly or rearwardly from the truck body 12. The keyed ends of the control bars for the panels 18 and 21 extend rearwardly of the truck body, and the keyed ends of the control bars for the front panels 19 and 20 extend forwardly of the truck body.

The end of the panel 19 adjacent the panel 20 has an overlying flange portion 103 which rests upon the panel 20 when the panels are in the closed position. The roof panel 18 has a similar flanged portion 104. These flanges assist in ensuring tight sealing of the roof in the closed position. Similarly, the rearward ends of the panels 18 and 21 and the forward ends of the panels 19 and 20 have an L-shaped flange portion 106 overlying the frame 16a for the panel 19.

To support the four roof panels in their closed position while permitting free overhead access to the body upon opening of the roof, top support bars are provided. Referring more particularly to FIGS. 11 and 12, support bars 111-115 are mounted laterally across the top of the truck body 12 in position to support the roof panels in their closed position. Each top support rod 111 is received in an apertured rod holder such as 116 and 117 on opposite sides of the truck body 12. The support rod 112 is received in apertured holders 118 and 119, and the support rods 113-115 are similarly received in apertured rod holding elements. The rod holding element 116 is rigidly attached to the upper track extrusion 87, and the rod holding element 117 is rigidly attached to the upper track extrusion 28.

In order to reposition the support rods 111 to permit loading and unloading of cargo through the top of the truck body 12 when the roof panels 18-21 are opened, each rod such as 111 may be lifted slightly and rotated to a position of alignment with one of the sides of the truck body. For example, the support rod 111 has a downwardly extending end portion 121 which is received in the apertured rod holder 116 and a longer downwardly extending portion 122 received in the apertured rod holding element 117. The rod 111 is raised to the dashed line position shown in FIG. 12 at 123 so that the rod end 121 is raised out of the holder 116 while the opposite rod end 122 is still partially within the aperture in the rod holder 117. The rod 111 is then rotated to the position shown at 124 in alignment with the side of the truck body where it may be maintained out of the way of cargo to be loaded or unloaded.

From the foregoing, it will be appreciated that the truck body of the present invention is adapted to readily accommodate long cargos, to be loaded and unloaded from the top of the truck, as well as commodities to be protectively contained during transport and cargos that commonly are loaded from the sides or rear of the truck. Moreover, the truck body of the present invention permits full-length opening of the top, as well as substantially unobstructed access from the rear and either side thereof. It will also be understood that relatively long cargos, such structural steel members up to about 35 feet in length, could be lowered by hoists into the top of such a 40 foot truck body with the roof panels opened, and if at the destination there was no overhead hoist for unloading, such members could be unloaded by lift truck or other means by opening diagonally opposed side doors and moving the members diagonally out from one open side to the diagonally opposed door on the opposite side of the truck. Likewise, elongated materials could be loaded into the truck in such fashion. In each case, opening of the top of the can be accomplished without auxiliary power means.

What is claimed is:

1. A truck body supported by a wheel assembly for operation on highways and the like comprising a base, and front rear and two lateral sides mounted on said base defining a cargo receiving area, a roof supported by said lateral sides for enclosing said cargo receiving area, each said lateral side of the truck body including a pair of sliding doors, means associated with each said lateral side defining a pair of adjacent upper door-receiving tracks and a pair of adjacent lower door-receiving tracks with one side door on each side of the truck body being slidably mounted in an inner pair of upper and lower tracks and another door on each side of the truck body being slidably mounted on an outer pair of said upper and lower tracks, each door being approximately half the length of the truck body and each pair of doors being slidable into an overlapping position to open approximately half of the lateral side of the truck body, said rear of the truck body including a rear door assembly that is operable to open essentially the entire rear side of the truck body for cargo access, said roof of said truck body including a plurality of roof panels which are movable between a first position closing the roof of the truck body and a second position opening the entire roof of the truck body, and a plurality of retractable supports interposed between said roof and base along each lateral side of the truck body, said supports being disposed at a location on said lateral side that is opened when said side doors are moved to their open positions, and said supports being retractable from an extended position between said roof and base to a retracted position that permits access to said cargo area from said side opening.

2. The truck body of claim 18 in which the retractable side supports each include a top panel and a bottom panel forming a generally continuous vertical support element when in said extended supporting position.

3. The truck body of claim 3 in which the top and bottom support panels are hingedly attached together and the upper end of the top panel is hingedly attached to the truck body, whereby the bottom panel may be rotated upwardly into engagement with the top panel and the top and bottom panels rotated upwardly to said retracted raised position.

4. The truck body of claim 4 which further comprises a locking member rotatably attached to one of the panels of each support along an edge thereof, said locking member being rotatable into locking engagement with an edge of both the top and bottom panels of the support when in their extended supporting position.

5. The truck body of claim 5 which further comprises means for locking the top and bottom panels of each support in their retracted raised position.

6. The truck body of claim 18 including a plurality of support bars transversely mounted between said lateral sides of the truck body for providing further support in said roof panels when in their closed positions, and said support bars being selectively positionable to locations that permit unobstructed access from the top of the body to said cargo area when said roof panels are in their open positions.

7. The truck body of claim 6 in which each said top support bar has downwardly extending ends, and a pair of apertured bar-holding elements mounted near the top of opposite lateral side walls, for slidably receiving the downwardly extending ends of each said bar.

8. The truck body of claim 8 in which one downwardly extending end of each support bar is shorter than the other downwardly extending end for the respective bar, whereby the support bar may be raised to a position wherein only one downwardly extending end is retained in an apertured bar-holding element and the support bar may thereupon be rotated to a position adjacent a lateral side of the truck body.

9. A truck body supported by a wheel assembly for operation on highways and the like comprising a base, and front, rear and two lateral sides mounted on said base defining a cargo receiving area, a roof supported by said lateral sides for enclosing said cargo receiving area, each said lateral side of the truck body including a pair of sliding doors, means associated with each said lateral side defining a pair of adjacent upper door-receiving tracks and a pair of adjacent lower door-receiving tracks with one side door on each side of the truck body being slidably mounted in an inner pair of upper and lower tracks and another door on each side of the truck body being slidably mounted on an outer pair of said upper and lower tracks, each door being approximately half the length of the truck body and each pair of doors being slidable into an overlapping position to open approximately half of the lateral side of the truck body, said rear of the truck body including a rear door assembly that is operable to open essentially the entire rear side of the truck body for cargo access, said roof of said truck body including a plurality of roof panels which are movable between a first position closing the roof of the truck body and a second position opening the entire roof of the truck body, and a plurality of support bars transversely mounted between said lateral sides of the truck body for providing further support in said roof panels when in their closed positions, said support bars being selectively positionable to locations that permit unobstructed access from the top of the body to said cargo area when said roof panels are in their open positions, each said top support bar having a downwardly extending ends, and a pair of apertured bar-holding elements mounted near the top of opposite lateral side walls, for slidably receiving the downwardly extending ends of each said bar, wherein one downwardly extending end of each support bar is shorter than the other downwardly extending end for the respective bar, whereby the support bar may be raised to a position wherein only one downwardly extending end is retained in an apertured bar-holding element and the support bar may thereupon be rotated to a position adjacent a lateral side of the truck body.

10. The truck body of claim 9 which further comprises a plurality of retractable supports interposed between said roof and base along each lateral side of the truck body, said supports being disposed at a location on said lateral side that is opened when said side doors are moved to their open positions, and said supports being retractable from an extended position between said roof and base to a retracted position that permits access to said cargo area from said side opening.

11. The truck body of claim 10 in which said roof comprises a plurality of panels pivotably mounted on the lateral body sides, each said panel extending from a respective lateral side to about the longitudinal center of said body, means at the end of said body for selectively pivoting each panel from a closed position covering a portion of said cargo receiving area to an open position, and said roof panels when all in their opened positions permit complete top access to the interior of said body.

12. The truck body of claim 11 in which the said roof panels extend one half the length of the lateral side upon which it is supported and cover one quarter of the said body when in a closed position, and each said roof panel has independently operable opening and closing means located at a respective end of said body.

13. The truck body of claim 11 in which said panel opening and closing means for each panel includes a control bar, each said control bar being disposed along the pivot axis of the panel and the respective lateral side with each control bar being rigidly attached to its associated panel and rotatably supported by the lateral side.

14. The truck body of claim 13 in which each control bar has an end portion which extends beyond an end of the truck body, and means removeably engageable with said end portion for rotating said bar and thereby opening and closing the panel.

15. The truck body of claim 14 in which said end bar portion is formed with a key shape, and said means for rotating said bar includes a tool having a head portion for receiving said control bar end.

* * * * *